3,274,061
PROCESS FOR STABILIZING SHELLAC COATING
Gene W. Johnston, Morris Plains, Ranjit I. Malani, East Orange, and Morton W. Scott, Livingston, N.J., assignors to Warner-Lambert Pharmaceutical Company, Morris Plains, N.J., a corporation of Delaware
No Drawing. Filed Apr. 29, 1963, Ser. No. 276,209
8 Claims. (Cl. 167—82)

This invention relates to a process for stabilizing shellac coatings. More particularly, this invention relates to a process for stabilizing the shellac coating on coated pharmaceutical dosage forms such as tablets, powders, granules, pellets, pills, capsules, cachets, and the like.

As is well known in the art, coatings are applied to solid pharmaceutical dosage forms such as compressed tablets, for example, to prevent gastric digestion of the therapeutic agents, to prevent any nausea and vomiting which may be caused by these agents or to give the active therapeutic ingredients a delayed action. These protective substances are commonly referred to as enteric coatings and for many years shellac has been the standard in the pharmaceutical and other industries where an enteric coating was desired for compressed tablets.

Since delayed absorption is desired it is obvious that the enteric coating should not disintegrate in the stomach but should disintegrate in the intestines where release of the therapeutic ingredients is desired. Generally, shellac coatings fulfill most of the requirements of a good enteric coating but suffer a major disadvantage in that they harden on aging. When hardening of the shellac occurs the aged coated material does not disintegrate readily to release the medicaments. This hardening effect is usually reflected in a delayed disintegration time and may occur to such an extent that the coated material will ultimately fail to meet the U.S.P. XVI disintegration test for enteric coated tablets. Prolonged disintegration or the failure to disintegrate is obviously quite undesirable. Thus, for example, shellac glazed candy does not dissolve readily where excessive hardening occurs after aging.

In order to avoid or circumvent this undesirable effect, many proposals have been made including the use of new enteric coating materials. Generally, these new enteric coating compositions have not proven to be satisfactory, some because of their cost, others because of their toxicity and some because of difficulties in achieving desired elegance.

It is therefore an important object of the present invention to provide a shellac enteric coating for tablets and the like which will disintegrate in accordance with the standard U.S.P. test applied to such enteric coated tablets but which will not materially lengthen in its disintegration time on aging.

Another object of this invention is the production of solid pharmaceutical dosage forms provided with such shellac coatings and which are substantially unaffected by aging.

We have now found that the foregoing and other objects are accomplished by subjecting pharmaceutical dosage forms to which a shellac enteric coating has been applied to a temperature of 65°–70° C. for about 16 hours. It has been found that by heating such shellac coatings at 65°–70° C. the shellac is polymerized to an equilibrium state. Once the equilibrium polymerization state is reached no further molecular rearrangement occurs on subsequent aging and, consequently, there is no increase in the disintegration time on aging.

An unexpected advantage of our novel process lies in the fact that less shellac can be used to impart satisfactory enteric properties to the coated tablets which are treated as described. Thus, for example, it is customary to apply five or more coats of a 7 pound cut shellac (7 pounds of shellac dissolved in 1 gallon of denatured alcohol) to obtain a satisfactory enteric coat. Such an enteric coat on aging shows an appreciable increase in disintegration time. On the other hand, when but two coats of a 7 pound cut shellac are applied, the desired enteric properties for protection against gastric disintegration are not obtained. However, when but two coats of a 7 pound cut of shellac are applied to tablets and these tablets are then subjected to heat treatment in accordance with the process of this invention, the treated coated tablets are found to have enteric properties that meet all of the U.S.P. requirements for enteric coatings quite satisfactorily. On subsequent storage and aging these tablets do not undergo any appreciable increase in disintegration time.

By requiring less shellac for enteric coating, these improved tablets enable further applications of other materials to be made, including other active ingredients or other coating materials without any undesirable increase in tablet size.

While the novel process of this invention finds its principal use in the coating of solid pharmaceutical forms, such as tablets, pills, granules, cachets and pellets, other shellac coated materials are also improved by this process.

The shellac used in forming these coating compositions is the ingestible, refined, arsenic-free grade which is commonly used for edible products and known in the trade as "pharmaceutical glaze." It is usually employed in the form of a solution formed by dissolving 7 pounds of shellac in 1 gallon of denatured alcohol.

The following example is included in order further to illustrate this invention.

Example 1

1000 capsule shaped tablets weighing 1 g. each are charged into a tablet coating pan. The pan is allowed to rotate and 2 coats of acacia solution (7%) are applied, with the tablets being dusted sparingly with talc in order to prevent sticking. Three coats of 7 pound cut shellac are then applied. The alcohol solvent in which the shellac is dissolved is then allowed to evaporate off at about 20° to 25° C. The shellac coated tablets are now spread on trays and heated at 65°–70° C. for 16 hours. Six of the finished tablets are then subjected to a U.S.P. XVI disintegration test for enteric coated tablets. The test results observed are as follows:

In gastric fluid—no disintegration in 1 hour
In intestinal fluid—disintegration in 40 to 50 minutes After the tablets are stored at 40°–45° C. for a period of 6 months the above disintegration test is repeated with the following results:

In gastric fluid—no disintegration in 1 hour
In intestinal fluid—disintegration in 35 to 50 minutes It is understood that the foregoing detailed description is given merely by way of illustration and that many variations may be made therein without departing from the spirit of our invention.

Having described our invention, what we desire to secure by Letters Patent is:

1. The process for stabilizing the disintegration time of a shellac coating on an orally ingestible product, which comprises heating said shellac coated orally ingestible product at a temperature of 65°–70° C. for at least 16 hours.

2. The process for stabilizing the disintegration time of a shellac coating on an orally ingestible product, which comprises coating said orally ingestible product with at least one coat of an alcoholic solution of shellac and heating said shellac coated orally ingestible product at a temperature of 65°–70° C. for at least 16 hours.

3. The process in accordance with claim 2 wherein said orally ingestible product is a tablet.

4. The orally ingestible product obtained in accordance with claim 2.

5. The process in accordance with claim 2 wherein said orally ingestible product is a pellet.

6. The process in accordance with claim 2 wherein said orally ingestible product is a pill.

7. The process in accordance with claim 2 wherein said orally ingestible product is a granule.

8. The process in accordance with claim 2 wherein said orally ingestible product is a cachet.

References Cited by the Examiner

UNITED STATES PATENTS

| | | | |
|---|---|---|---|
| 2,948,626 | 8/1960 | Sanders | 167—82 |
| 2,982,234 | 5/1961 | Ackley et al. | 167—82 |

JULIAN S. LEVITT, *Primary Examiner.*

FRANK CACCIAPAGLIA, Jr., *Examiner.*

GEORGE A. MENTIS, *Assistant Examiner.*